United States Patent
Yagita et al.

(10) Patent No.: US 10,138,758 B2
(45) Date of Patent: Nov. 27, 2018

(54) QUATRO-GENERATION SYSTEM

(71) Applicant: MITSUBISHI HEAVY INDUSTRIES, LTD., Tokyo (JP)

(72) Inventors: Hiroyuki Yagita, Tokyo (JP); Kouji Abe, Tokyo (JP); Takao Koide, Tokyo (JP); Toshihide Noguchi, Tokyo (JP); Tomoaki Nakai, Tokyo (JP); Hiroaki Ishikawa, Tokyo (JP); Hiroyuki Esashi, Tokyo (JP); Jun Hyodo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 448 days.

(21) Appl. No.: 15/021,097

(22) PCT Filed: Sep. 4, 2014

(86) PCT No.: PCT/JP2014/073292
§ 371 (c)(1),
(2) Date: Mar. 10, 2016

(87) PCT Pub. No.: WO2015/045778
PCT Pub. Date: Apr. 2, 2015

(65) Prior Publication Data
US 2016/0215656 A1    Jul. 28, 2016

(30) Foreign Application Priority Data

Sep. 25, 2013 (JP) ................................. 2013-198636

(51) Int. Cl.
*F01K 7/12* (2006.01)
*F01K 23/04* (2006.01)
(Continued)

(52) U.S. Cl.
CPC .................. *F01K 7/12* (2013.01); *F01K 5/00* (2013.01); *F01K 5/02* (2013.01); *F01K 23/10* (2013.01);
(Continued)

(58) Field of Classification Search
CPC . F01K 7/12; F01K 23/04; F01K 23/10; F02C 6/18; Y02E 20/16; F05D 2220/72; F05D 2220/722
See application file for complete search history.

(56) References Cited

U.S. PATENT DOCUMENTS

2004/0011057 A1* 1/2004 Huber ...................... F02C 3/28
60/781
2004/0079088 A1    4/2004 Hayakawa et al.
(Continued)

FOREIGN PATENT DOCUMENTS

JP    11-173109    6/1999
JP    2000-110511    4/2000
(Continued)

OTHER PUBLICATIONS

International Preliminary Report on Patentability dated Mar. 29, 2016 in corresponding International Application No. PCT/JP2014/073292 (with English translation).
(Continued)

*Primary Examiner* — Andrew Nguyen
(74) *Attorney, Agent, or Firm* — Wenderoth, Lind & Ponack, L.L.P.

(57) ABSTRACT

The quatro generation system of the present invention includes: a power generation engine driven by fuel gas; an exhaust-heat boiler configured to utilize energy of exhaust gas discharged from the power generation engine to produce steam from boiler water; a boiler-water circulation device configured to supply the steam produced by the exhaust-heat boiler to a steam-energy recovery unit, and to return condensed water of the steam to the exhaust-heat boiler after the steam-energy recovery unit recovers energy of the steam; a condensation economizer configured to utilize condensation latent heat of exhaust gas discharged from the exhaust-heat boiler to heat a heat medium; and a heat-medium circulation (Continued)

device configured to supply the heat medium heated by the condensation economizer to a thermal-energy recovery unit, and to return the heat medium to the condensation economizer after the thermal-energy recovery unit recovers energy of the heat medium.

8 Claims, 3 Drawing Sheets

(51) Int. Cl.
*F01K 23/10* (2006.01)
*F02G 5/04* (2006.01)
*F01K 5/02* (2006.01)
*F02C 6/18* (2006.01)
*F02G 5/02* (2006.01)
*F01K 5/00* (2006.01)

(52) U.S. Cl.
CPC ............... *F02C 6/18* (2013.01); *F02G 5/02* (2013.01); *F02G 5/04* (2013.01); *Y02E 20/14* (2013.01); *Y02E 20/16* (2013.01); *Y02T 10/166* (2013.01)

(56) References Cited

U.S. PATENT DOCUMENTS

| | | | |
|---|---|---|---|
| 2006/0107646 A1* | 5/2006 | Hatamiya | F02C 3/30 60/39.53 |
| 2006/0130482 A1 | 6/2006 | Chino et al. | |
| 2013/0227957 A1 | 9/2013 | Droux et al. | |

FOREIGN PATENT DOCUMENTS

| | | |
|---|---|---|
| JP | 2002-115867 | 4/2002 |
| JP | 2002-295867 | 10/2002 |
| JP | 2003-074375 | 3/2003 |
| JP | 2005-48640 | 2/2005 |
| JP | 2006-194242 | 7/2006 |
| JP | 2007-263010 | 10/2007 |
| JP | 2012-007818 | 1/2012 |

OTHER PUBLICATIONS

International Search Report dated Dec. 9, 2014 in corresponding International Application No. PCT/JP2014/073292.
Office Action dated Oct. 20, 2015 in corresponding Japanese Application No. 2013-198636 (with English translation).
Decision to Grant a Patent dated Apr. 1, 2016 in corresponding Japanese Application No. 2013-198636 (with English translation).

* cited by examiner

QUATRO-GENERATION SYSTEM

TECHNICAL FIELD

The present disclosure relates to a quatro-generation system which recovers energy of exhaust gas produced during power generation with a condensation economizer.

BACKGROUND ART

A co-generation system which supplies electric power and heat at the same time has been known. This co-generation system generates power by driving a gas turbine or the like with fuel gas such as city gas, and produces steam by heating a boiler with produced exhaust gas, thus being a heat-and-power supply system capable of achieving a high thermal efficiency in total. For instance, Patent Document 1 discloses a co-generation system which generates power with a gas turbine and supplies the generated power to a complex facility such as a department store, and utilizes thermal energy of exhaust gas as energy for air conditioning in the facility.

CITATION LIST

Patent Literature

Patent Document 1: JP2002-115867A
Patent Document 2: JP2003-74375A

SUMMARY

Problems to be Solved

The present inventors conducted intensive researches to further improve the thermal efficiency of a conventional co-generation system, and found that further improvement of the thermal efficiency can be achieved by providing a condensation economizer and utilizing condensation latent heat of discharged exhaust gas. The novel co-generation system invented by the present inventors is a novel system that can be called a quatro-generation system, for instance, for it is capable of producing four useful resources: "electric power" and "steam", also produced by a known system, and in addition, "heat" recovered by a condensation economizer, and "condensed water" condensed by the condensation economizer.

Whereas Patent Document 2 discloses a co-generation system including a condensation economizer disposed on an exhaust-gas outlet of a boiler, the co-generation system of patent Document 2 is considerably different from the present invention in system configuration as follows.

The co-generation system of Patent Document 2 includes a small boiler and a small gas turbine provided in combination. The small boiler uses less boiler water than a large boiler, and thus it is uneconomic to recover steam produced from boiler water as condensed water to reuse as boiler water. Therefore, in Patent Document 2, water is supplied from outside and heated by a condensation economizer, and the heated supplied water is supplied to a boiler as boiler water. In addition, moisture in exhaust gas condensed by the condensation economizer is also used as boiler water.

In contrast, the exhaust-heat boiler of the present invention is a large boiler which includes a boiler-water circulation device for recovering steam produced by the exhaust-heat boiler as condensed water to reuse as boiler water, as described below. Further, the condensation economizer of the present invention produces thermal energy and condensation water to be supplied to a thermal-energy consumer and a water consumer, as described below, and has a totally different role within the system from that of the condensation economizer of Patent Document 2.

At least one embodiment of the present invention was made under the above background, and an object of the at least one embodiment of the present invention is to provide a novel quatro-generation system with a total thermal efficiency higher than that of a conventional co-generation system.

Solution to the Problems

A quarto-generation system according to at least one embodiment of the present invention comprises: a power generation engine driven by fuel gas; an exhaust-heat boiler configured to utilize energy of exhaust gas discharged from the power generation engine to produce steam from boiler water; a boiler-water circulation device configured to supply the steam produced by the exhaust-heat boiler to a steam-energy recovery unit, and to return condensed water of the steam to the exhaust-heat boiler after the steam-energy recovery unit recovers energy of the steam; a condensation economizer configured to utilize condensation latent heat of exhaust gas discharged from the exhaust-heat boiler to heat a heat medium; and a heat-medium circulation device configured to supply the heat medium heated by the condensation economizer to a thermal-energy recovery unit, and to return the heat medium to the condensation economizer after the thermal-energy recovery unit recovers energy of the heat medium.

According to at least one embodiment of the present invention, a co-generation system is provided with a condensation economizer to utilize condensation latent heat of exhaust gas discharged from an exhaust-heat boiler, which makes it possible to improve the thermal efficiency even further.

For instance, assume that the quantity of energy inputted as fuel gas is 100, and a conventional co-generation system recovers 40 as electric energy and another 40 as steam energy. In this case, the total thermal efficiency is 80%. In contrast, in the present embodiment, electric energy and steam energy are recovered 40 each, and in addition, the condensation economizer recovers approximately 5 as thermal energy, which makes the total thermal efficiency approximately 85%.

In some embodiments, the quarto-generation system further comprises an exhaust-gas condensed water supply device configured to supply condensed water of the exhaust gas condensed by the condensation economizer to a water consumer. In an embodiment, the water consumer comprises a complex facility or an area comprising a plurality of elements which includes at least one of a residence, a tenant shop, or an office.

According to the above embodiment, it is possible to utilize condensed water condensed by the condensation economizer effectively. In other words, the quatro-generation system of the present embodiment is a novel system capable of producing four useful resources in total: "electric power" and "steam", also produced by a known co-generation system, and in addition, "heat" recovered by the condensation economizer, and "condensed water" condensed by the condensation economizer.

In some embodiments, the power generation engine comprises: a gas turbine driven by fuel gas; and a first generator driven by shaft output of the gas turbine.

In some embodiments, the exhaust-heat boiler comprises an exhaust-gas reheat boiler configured to utilize the exhaust gas discharged from the power generation engine as combustion air.

In some embodiments, the thermal energy recovery unit comprises a heat-medium heat exchanger configured to recover energy from the heat medium as a heat source for heating air or water in a thermal-energy consumer which comprises a complex facility or an area comprising a plurality of elements including at least one of a residence, a tenant shop, or an office.

According to the above embodiment, it is possible to make use of the thermal energy of exhaust gas recovered by the condensation economizer as a heat source for heating air or water in a thermal-energy consumer comprising a complex facility or an area.

In some embodiments, the steam energy recovery unit comprises: a steam turbine driven by the steam; and a second generator driven by shaft output of the steam turbine.

According to the above embodiment, it is possible to generate power utilizing energy of steam generated by the exhaust-heat boiler.

In some embodiments, the steam-energy recovery unit comprises a steam heat exchanger configured to recover energy from the steam as a heat source for air conditioning or freezing in a thermal-energy consumer which comprises a complex facility or an area comprising a plurality of elements including at least one of a residence, a tenant shop, or an office.

According to the above embodiment, it is possible to make use of the thermal energy of steam produced by the exhaust-heat boiler as a heat source of air conditioning or freezing in a complex facility or an area.

In some embodiments, the quarto-generation system further comprises an exhaust-gas heat exchanger configured to recover energy of the exhaust gas discharged from the condensation economizer.

According to the above embodiment, it is possible to improve the total thermal efficiency of the entire system even further by recovering thermal energy of exhaust gas discharged from the condensation economizer.

Advantageous Effects

According to at least one embodiment of the present invention, it is possible to provide a novel quatro-generation system with a total thermal efficiency higher than that of a conventional co-generation system.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

Figure 1:
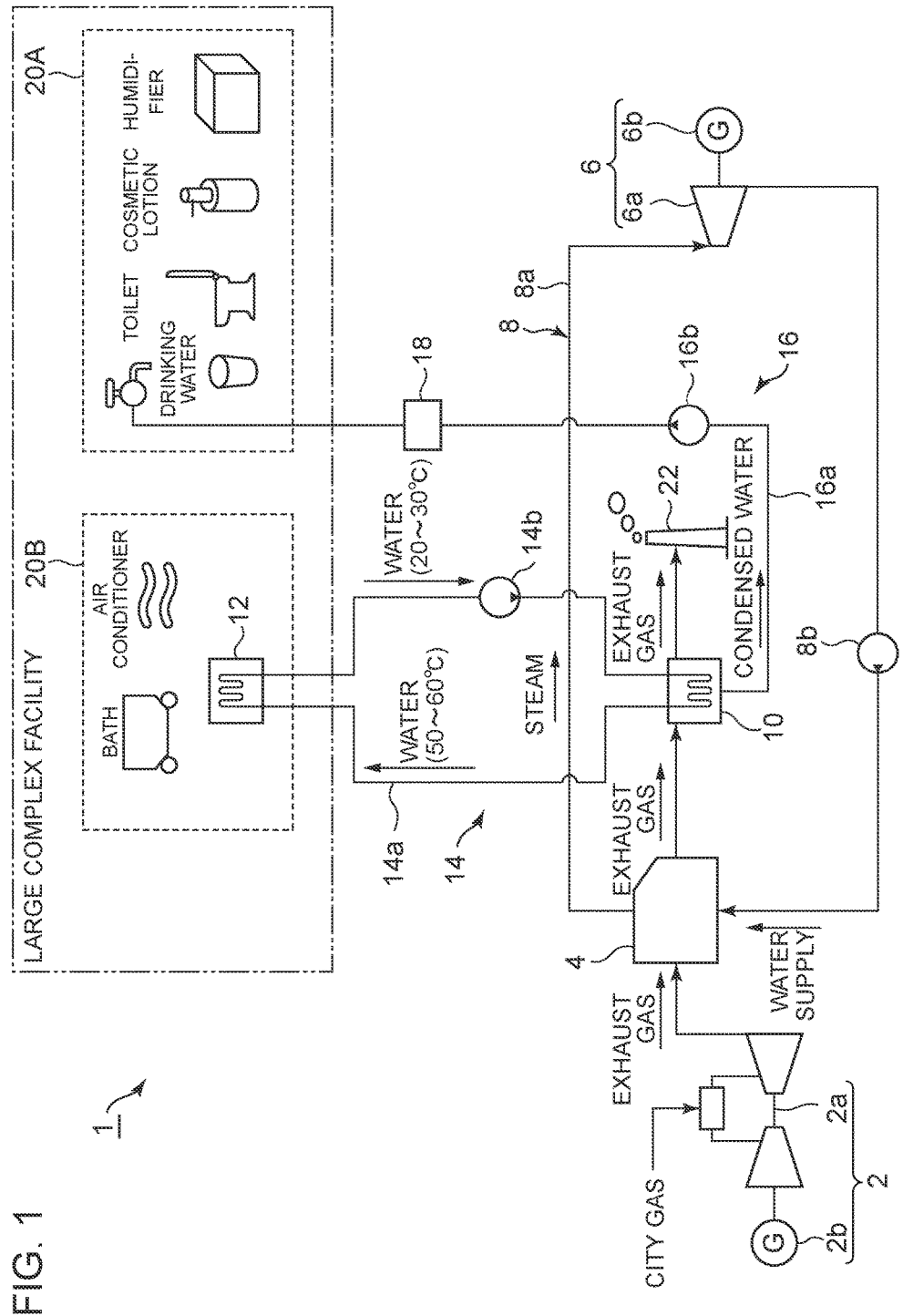
FIG. 1 is a schematic diagram illustrating an overall configuration of a quatro-generation system according to an embodiment of the present invention.

FIG. 1 is a schematic diagram illustrating an overall configuration of a quatro-generation system according to an embodiment of the present invention.

The quatro-generation system 1 according to the present embodiment at least includes a power generation engine 2, an exhaust-heat boiler 4, a steam-energy recovery unit 6, a boiler-water circulation device 8, a condensation economizer 10, a thermal-energy recovery unit 12, and a heat-medium circulation device 14.

The power generation engine 2 of the present embodiment includes a gas turbine 2a driven by fuel gas such as city gas, and the first generator 2b driven by shaft output of the gas turbine 2a. In this way, the power generation engine 2 can generate power from combustion energy of the city gas.

The configuration of the power generation engine 2 of the present invention is not limited to the above configuration. The power generation engine 2 of the present invention may be, for instance, a combination of a gas engine driven by fuel gas and a generator driven by the gas engine, or a solid-oxide fuel cell (SOFC) which produces electricity from fuel gas.

The high-temperature exhaust gas discharged from the power generation engine 2 is supplied to the exhaust-heat boiler 4. The exhaust-heat boiler 4 produces steam by utilizing energy of exhaust gas discharged from the power generation engine 2.

In some embodiments, the exhaust-heat boiler 4 comprises an exhaust-gas reheat boiler which utilizes exhaust gas discharged from the power generation engine 2 as combustion air. According to the above embodiment, it is possible to improve the boiler efficiency as compared to a case where the exhaust-heat boiler 4 comprises an exhaust-heat recovery boiler.

Steam produced by the exhaust-heat boiler 4 is supplied to a steam-energy recovery unit 6 via a steam channel 8a formed to circulate. The steam-energy recovery unit 6 of the present embodiment includes a steam turbine 6a driven by steam, and the second generator 6b driven by shaft output of the steam turbine 6a. In this way, power is generated from steam produced by the exhaust-heat boiler 4, which makes it possible to recover steam energy with the steam-energy recovery unit 6.

Further, a condensed-water circulation pump 8b for returning condensed water of steam condensed by the steam-energy recovery unit 6 to the exhaust-heat boiler 4 as boiler water is disposed on the downstream side, with respect of a flow direction, of the steam-energy recovery unit 6 in the steam channel 8a. In the present embodiment, the above steam channel 8a and the condensed-water circulation pump 8b constitute the boiler-water circulation device 8.

Mid-temperature exhaust gas discharged from the exhaust-heat boiler 4 is supplied to the condensation economizer 10. The condensation economizer 10 heats a heat medium utilizing condensation latent heat of exhaust gas discharged from the exhaust-heat boiler 4.

Figure 2:
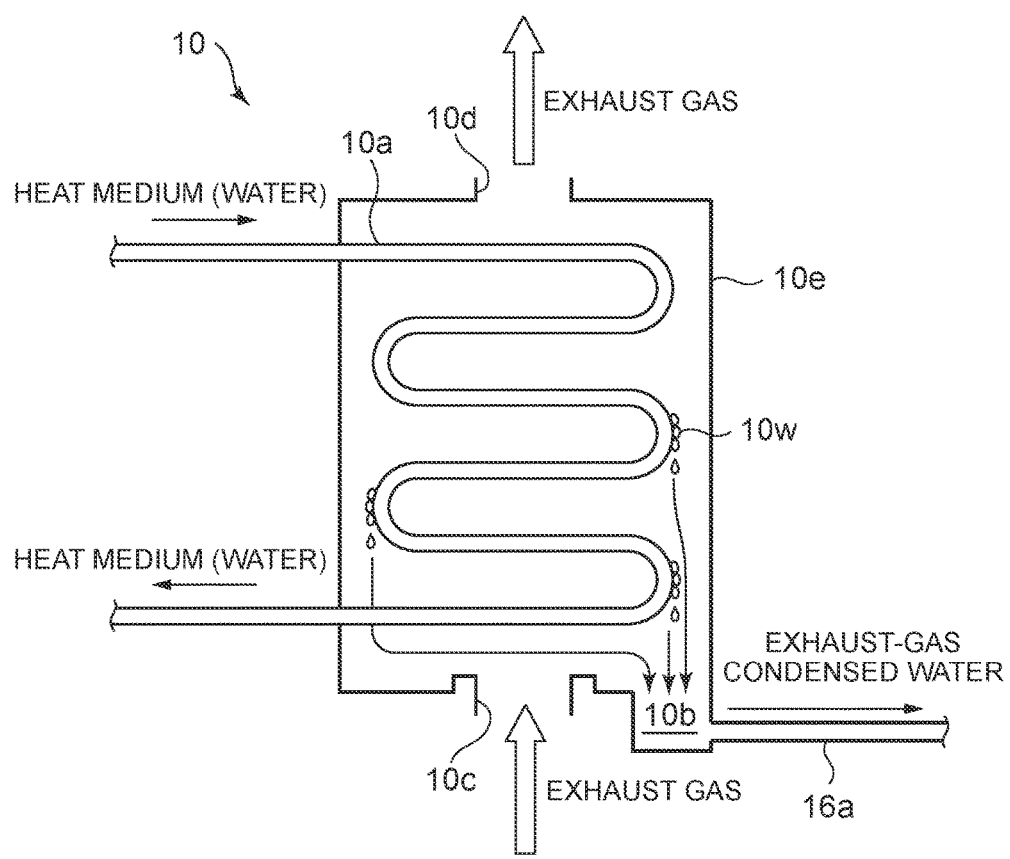
FIG. 2 is a schematic diagram of an interior configuration of a condensation economizer.

FIG. 2 is a schematic diagram of an interior configuration of a condensation economizer.

As illustrated in FIG. 2, a heat-exchanger tube 10a is disposed in a tortuous pattern inside a casing 10e of the condensation economizer 10. An exhaust-gas inlet 10c is disposed on one of the sides of the casing 10e, and an exhaust-gas outlet 10d is disposed on another one of the sides of the casing 10e. Exhaust gas flows inside the casing 10e from the exhaust-gas inlet 10c toward the exhaust-gas outlet 10d, thereby contacting the heat-exchanger tube 10a to heat a heat medium such as water flowing inside the heat-exchanger tube 10a. At this time, moisture in the exhaust gas is condensed to adhere to the surface of the heat-exchanger tube 10a. The adhering condensed water (exhaust-gas condensed water) 10w is collected in an exhaust-gas condensed water recovery part 10b formed at the bottom of the casing 10e.

The heat medium heated by the condensation economizer 10 is supplied to a thermal-energy recovery unit 12 via a heat-medium channel 14a formed to circulate. The thermal-energy recovery unit 12 of the present embodiment includes a heat-medium heat exchanger 12 which exchanges heat with a heat medium to recover thermal energy from the heat medium. The thermal energy recovered by the heat-medium heat exchanger 12 is consumed by the thermal-energy consumer 20B described below. Low-temperature exhaust gas discharged from the condensation economizer 10 is purified by a purifier (not illustrated) and then discharged outside via a chimney 22.

Further, a heat-medium circulation pump 14b for returning the heat medium cooled by heat exchange with the thermal-energy recovery unit 12 to the condensation economizer 10 is disposed on the downstream side, with respect to the flow direction, of the thermal-energy recovery unit 12 in the heat-medium channel 14a. In the present embodiment, the above heat-medium channel 14a and the heat-medium circulation pump 14b constitute the heat-medium circulation device 14.

Further, exhaust-gas condensed water collected in the above described exhaust-gas condensed water recovery part 10b of the condensation economizer 10 is supplied to a water-consumer 20A by an exhaust-gas condensed-water supply pump 16b disposed in an exhaust-gas condensed water supply channel 16a, via the exhaust-gas condensed water supply channel 16a. In the present embodiment, the above exhaust-gas condensed water supply channel 16a and the exhaust-gas condensed-water supply pump 16b constitute the exhaust-gas condensed water supply device 16. The reference numeral 18 indicates an exhaust-gas condensed water processor 18, disposed in the exhaust-gas condensed water supply channel 16a, for adjusting an acidic condition of exhaust-gas condensed water to be a desired pH in accordance with a usage.

The water consumer 20A and the thermal-energy consumer 20B are bodies that utilize the exhaust-gas condensed water and the thermal energy recovered by the heat-medium heat exchanger 12, including a large complex facility or an area constituted of a plurality of elements including at least one of a residence, a tenant shop, or an office. A residence refers to a unit of an apartment complex or a stand-alone house inhabited by a family. A tenant shop refers to a shop or the like which occupies a section of a commercial facility and offers services to the general consumer. The business category of tenant shops may include, for instance, retailing businesses such as clothing stores, grocery stores, drug stores, and alcohol stores, as well as food-service businesses such as restaurants, cafes, sushi bars, pubs, and so on. An office refers to a place which occupies a section of an office building and where employees working at the place do desk work for a certain purpose, for instance.

The exhaust-gas condensed water is utilized by the water consumer 20A described above as drinking water, domestic water, or commercial water. The exhaust-gas condensed water does not contain a hardness-increasing component such as calcium salt and magnesium salt, and thus can be suitably used for cosmetic lotion and humidification, in particular.

The thermal energy recovered by the heat-medium heat exchanger 12 is utilized as a heat source for heating air and water, for instance, by the thermal-energy consumer described above.

According to the present embodiment, a co-generation system is provided with the condensation economizer 10 to utilize condensation latent heat of exhaust gas discharged from the exhaust-heat boiler 4, which makes it possible to improve the thermal efficiency even further.

For instance, assume that the quantity of energy inputted as fuel gas is 100, and a conventional co-generation system recovers 40 as electric energy and another 40 as steam energy. In this case, the total thermal efficiency is 80%. In contrast, in the present embodiment, the power generation engine 2 recovers 40 as electric energy, and the steam-energy recovery unit 6 recovers another 40 as steam energy, and in addition, the condensation economizer 10 recovers approximately 5 as thermal energy, which makes the total thermal efficiency approximately 85%. In other words, providing the condensation economizer 10 makes it possible to improve the thermal efficiency of the entire system by approximately 5% as compared to a conventional system.

Further, as described above, the exhaust-gas condensed water supply device 16 is provided to supply exhaust-condensed water condensed by the condensation economizer 10 to the water consumer 20A, which makes it possible to make use of the exhaust-gas condensed water condensed by the condensation economizer 10 effectively. In other words, the quatro-generation system 1 of the present embodiment is a novel system capable of producing four useful resources in total: "electric power" and "steam", produced by a conventional co-generation system, "heat" recovered by the condensation economizer 10, and "condensed water" condensed by the condensation economizer 10.

Figure 3:
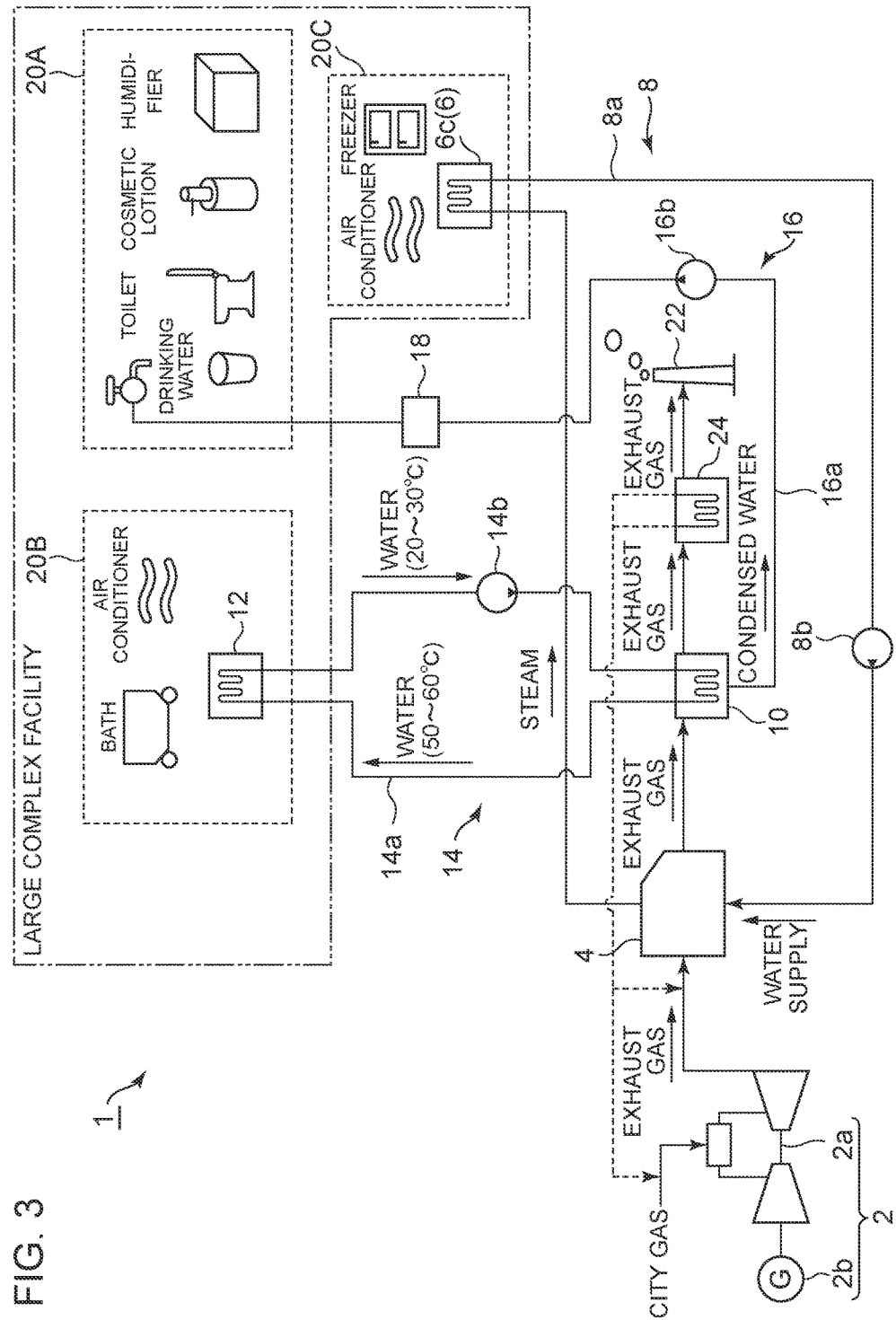
FIG. 3 is a schematic diagram illustrating an overall configuration of a quatro-generation system according to an embodiment of the present invention.

FIG. 3 is a schematic diagram illustrating an overall configuration of a quatro-generation system according to an embodiment of the present invention.

The present embodiment basically has the same configuration as that of the above described embodiment. Thus, the same component is associated with the same reference numeral and not described in detail.

As illustrated in FIG. 3, the quatro-generation system 1 of the present embodiment is different from the above embodiment in that the above described steam-energy recovery unit 6 includes a steam heat exchanger 6c for recovering energy from steam. Energy recovered by the steam heat exchanger 6c is utilized as a heat source for air conditioning or freezing by a thermal-energy consumer 20C. The thermal-energy consumer 20C is a body that utilizes energy recovered by the steam heat exchanger 6c, and includes a large complex facility, an area, or the like constituted of a plurality of elements including at least one of a residence, a tenant shop, or an office, similarly to the above described water consumer 20A and thermal-energy consumer 20B.

According to the above embodiment, it is possible to make use of the thermal energy of steam produced by the exhaust-heat boiler 4 as a heat source of a complex facility or an area. High-temperature and high-pressure steam recovered by the exhaust reheat boiler can be efficiently used as a heat source for air conditioning or freezing, in particular.

Further, the quatro-generation system 1 of the present embodiment further includes an exhaust-gas heat exchanger 24 for recovering energy of low-temperature exhaust gas discharged from the condensation economizer 10, as illustrated in FIG. 3. The thermal energy recovered by the exhaust-gas heat exchanger 24 can be utilized as a heat source for heating (pre-heating) fuel gas to be supplied to the gas turbine 2a, or a heat source for heating (pre-heating) combustion air to be supplied to the exhaust-gas reheat boiler 4.

According to the above embodiment, it is possible to improve the total thermal efficiency of the system as a whole even further by recovering thermal energy of low-temperature exhaust gas discharged from the condensation economizer 10.

The embodiments of the present invention have been described above. However, the present invention is not limited thereto. For instance, various modifications may be applied in combination as long as they do not depart from the object of the present invention.

INDUSTRIAL APPLICABILITY

At least one embodiment of the present invention can be suitably used in a large complex facility or an area including a plurality of elements including a residence, a tenant shop, or an office, for instance, as a novel co-generation system (quatro-generation system) capable of producing four useful resources in total: "electric power" and "steam", also produced by a known system, and in addition, "heat" recovered by the condensation economizer, and "condensed water" condensed by the condensation economizer.

DESCRIPTION OF REFERENCE NUMERALS

1 Quatro-generation system
2 Power generation engine
2a Gas turbine
2b First generator
4 Exhaust-heat boiler (exhaust-gas reheat boiler)
6 Steam-energy recovery unit
6a Steam turbine
6b Second generator
6c Steam heat exchanger
8 Boiler-water circulation device
8a Steam channel
8b Condensed-water circulation pump
10 Condensation economizer
10a Heat-exchanger tube
10b Exhaust-gas condensed water recovery part
10c Exhaust-gas inlet
10d Exhaust-gas outlet
10e Casing
12 Thermal-energy recovery unit (heat-medium heat exchanger)
14 Heat-medium circulation device
14a Heat-medium channel
14b Heat-medium circulation pump
16 Exhaust-gas condensed water supply device
16a Exhaust-gas condensed water supply channel
16b Exhaust-gas condensed water supply pump
18 Exhaust-gas condensed water processor
20A Water-consumer
20B Thermal-energy consumer
20C Thermal-energy consumer
22 Chimney
24 Exhaust-gas heat exchanger

The invention claimed is:

1. A quarto-generation system, comprising:
a power generation engine driven by fuel gas;
an exhaust-heat boiler configured to utilize energy of exhaust gas discharged from the power generation engine to produce steam from boiler water;
a boiler-water circulation device configured to supply the steam produced by the exhaust-heat boiler to a steam-energy recovery unit, and to return condensed water of the steam to the exhaust-heat boiler after the steam-energy recovery unit recovers energy of the steam;
a condensation economizer configured to utilize condensation latent heat of exhaust gas discharged from the exhaust-heat boiler to heat a heat medium;
a heat-medium circulation device configured to supply the heat medium heated by the condensation economizer to a thermal-energy recovery unit, and to return the heat medium to the condensation economizer after the thermal-energy recovery unit recovers energy of the heat medium; and
an exhaust-gas condensed water supply device configured to supply condensed water of the exhaust gas condensed by the condensation economizer to a water consumer.

2. The quarto-generation system according to claim 1, wherein the water consumer comprises a complex facility or an area comprising a plurality of elements which includes at least one of a residence, a tenant shop, or an office.

3. The quarto-generation system according to claim 1, wherein the power generation engine comprises: a gas turbine driven by the fuel gas; and a first generator driven by shaft output of the gas turbine.

4. The quarto-generation system according to claim 1, wherein the exhaust-heat boiler comprises an exhaust-gas reheat boiler configured to utilize the exhaust gas discharged from the power generation engine as combustion air.

5. The quarto-generation system according to claim 1, wherein the thermal energy recovery unit comprises a heat-medium heat exchanger configured to recover energy from the heat medium as a heat source for heating air or water in a thermal-energy consumer which comprises a complex facility or an area comprising a plurality of elements including at least one of a residence, a tenant shop, or an office.

6. The quarto-generation system according to claim 1, wherein the steam energy recovery unit comprises:
a steam turbine driven by the steam; and
a second generator driven by shaft output of the steam turbine.

7. The quarto-generation system according to claim 1, wherein the steam-energy recovery unit comprises a steam heat exchanger configured to recover energy from the steam as a heat source for air conditioning or freezing in a thermal-energy consumer which comprises a complex facility or an area comprising a plurality of elements including at least one of a residence, a tenant shop, or an office.

8. The quarto-generation system according to claim 1, further comprising
an exhaust-gas heat exchanger configured to recover energy of the exhaust gas discharged from the condensation economizer.

* * * * *